US010232798B2

(12) United States Patent
Gunes

(10) Patent No.: US 10,232,798 B2
(45) Date of Patent: Mar. 19, 2019

(54) APPARATUSES FOR MOUNTING CAMERA ARRANGEMENTS ON MOTOR VEHICLES

(71) Applicant: Autoliv ASP, Inc., Ogden, UT (US)

(72) Inventor: Melih Gunes, Wixom, MI (US)

(73) Assignee: VEONEER US, INC., Southfield, MI (US)

( * ) Notice: Subject to any disclaimer, the term of this patent is extended or adjusted under 35 U.S.C. 154(b) by 357 days.

(21) Appl. No.: 15/010,325

(22) Filed: Jan. 29, 2016

(65) Prior Publication Data
US 2017/0217382 A1 Aug. 3, 2017

(51) Int. Cl.
B60R 11/04 (2006.01)
H04N 5/20 (2006.01)
B60R 1/00 (2006.01)
H04N 5/225 (2006.01)
B60R 11/00 (2006.01)

(52) U.S. Cl.
CPC ............. B60R 11/04 (2013.01); B60R 1/00 (2013.01); H04N 5/2252 (2013.01); H04N 5/2257 (2013.01); B60R 2011/005 (2013.01); B60R 2011/0026 (2013.01); B60R 2011/0084 (2013.01); B60R 2300/107 (2013.01); H04N 2213/001 (2013.01)

(58) Field of Classification Search
CPC .............................. B60R 11/04; H04N 5/2257
USPC ........................................................... 348/47
See application file for complete search history.

(56) References Cited

U.S. PATENT DOCUMENTS

| 6,811,330 | B1 | 11/2004 | Tozawa |
| 8,077,295 | B2 | 12/2011 | Inagaki et al. |
| 8,192,095 | B2 | 6/2012 | Kortan et al. |
| 8,256,821 | B2 | 9/2012 | Lawlor et al. |
| 2014/0016919 | A1 | 1/2014 | Okuda |
| 2015/0042804 | A1* | 2/2015 | Okuda .................... B60R 11/04 348/148 |
| 2015/0158435 | A1 | 6/2015 | Ohsumi |
| 2015/0326760 | A1 | 11/2015 | Knutsson et al. |
| 2016/0006911 | A1 | 1/2016 | Kimura et al. |
| 2017/0240120 | A1 | 8/2017 | Krug et al. |

OTHER PUBLICATIONS

International Search Report and Written Opinion of PCTUS2017/014543, dated Apr. 7, 2017.

* cited by examiner

Primary Examiner — Jeffery A Williams
(74) Attorney, Agent, or Firm — Brinks Gilson & Lione

(57) ABSTRACT

An apparatus for mounting a camera arrangement on a motor vehicle is provided. The apparatus has a camera housing that includes a main body configured for holding the camera arrangement in a predetermined position. A 3-attachment feature arrangement is coupled to the main body for mounting the main body to the motor vehicle. The 3-attachment feature arrangement includes a first attachment feature having a first longitudinal centerline. A second attachment feature has a second longitudinal centerline. A third attachment feature has a third longitudinal centerline. The second and third longitudinal centerlines are aligned to define a common centerline and the first longitudinal centerline intersects the common centerline proximate a midpoint between the second attachment feature and the third attachment feature.

14 Claims, 6 Drawing Sheets

APPARATUSES FOR MOUNTING CAMERA ARRANGEMENTS ON MOTOR VEHICLES

TECHNICAL FIELD

The technical field relates generally to camera systems for motor vehicles, and more particularly relates to apparatuses for mounting camera arrangements, such as, for example, a stereo-camera arrangement, on a motor vehicle.

BACKGROUND

In recent years, vehicle drive supporting systems that include a camera mounted on the motor vehicle have been proposed. In many of these systems, a camera(s) is used to collect forward data in a vehicle running direction, e.g., forward direction, to provide information for safety to the driver and/or to facilitate automatically performing a vehicle control operation or the like.

Conventionally, a mounting structure that includes a camera housing is used to support the camera(s) in a predetermined position, e.g., forward facing position, on the motor vehicle. For example, the mounting structure can be used to mount one or more cameras on a backside (e.g., vehicle interior facing side) of a front windshield of the motor vehicle with the camera(s) facing forward to collect forward data in the vehicle running direction.

Stereo cameras (e.g., camera arrangements having a pair of cameras that can be mounted, for example, on a backside of a front windshield with one camera arranged proximate a left side and the other camera arranged proximate a right side of the motor vehicle) can be used to obtain distance measurements or the like. Camera housings, especially for stereo cameras, have very tight tolerances particularly after the cameras have been calibrated so that the optical centerlines of the cameras are parallel. The relative positions of the left and right cameras to each other must remain practically constant at all times to maintain optical centerline parallelism. Expansion and contraction of the camera housing due to temperature changes can be problematic if the relative positions of the left and right cameras are altered and their optical centerlines do not remain parallel. Additionally, the cameras need to be attached to the motor vehicle, e.g., on the backside of the vehicle windshield, in a way that the cameras remain steadily without substantial tipping, wobbling, or the like. Such attachment means should be simple, preferably without requiring any special tools and/or without deforming the camera housing when securing the camera housing to the motor vehicle, which might otherwise impair the parallelism of the optical centerlines of the cameras. Accordingly, there is a need to provide an apparatus for mounting a camera arrangement on a motor vehicle that can address one or more of the concerns.

BRIEF SUMMARY

Apparatuses for mounting camera arrangements on motor vehicles are provided herein. In accordance with an exemplary embodiment, an apparatus for mounting the camera arrangement on a motor vehicle includes a camera housing. The camera housing includes a main body that is configured for holding the camera arrangement in a predetermined position. A 3-attachment feature arrangement is coupled to the main body and is configured for mounting the main body to the motor vehicle. The 3-attachment feature arrangement includes a first attachment feature having a first longitudinal centerline. A second attachment feature has a second longitudinal centerline. A third attachment feature has a third longitudinal centerline. The second and third longitudinal centerlines are aligned to define a common centerline and the first longitudinal centerline intersects the common centerline proximate a midpoint between the second attachment feature and the third attachment feature.

In accordance with another exemplary embodiment, an apparatus for mounting a camera arrangement on a motor vehicle is provided. The apparatus includes the camera arrangement configured as a stereo-camera arrangement that includes a first camera and a second camera. A camera housing includes a main body that holds the first camera laterally spaced apart from the second camera. A 3-attachment feature arrangement is coupled to the main body and is configured for mounting the main body to the motor vehicle. The 3-attachment feature arrangement includes a first forward attachment feature that has a first longitudinal centerline. A second rear attachment feature has a second longitudinal centerline and a third rear attachment feature has a third longitudinal centerline. The first, second, and third longitudinal centerlines are substantially coplanar and the second and third rear attachment features are disposed generally inboard of the first and second cameras.

In accordance with another exemplary embodiment, an apparatus for mounting a camera arrangement on a motor vehicle is provided. The apparatus includes a camera housing. The camera housing includes a main body that is configured for holding the camera arrangement in a predetermined position. A 3-pin arrangement is coupled to the main body and is configured for attaching to a windshield bracket that mounts on or proximate to a windshield of the motor vehicle. The 3-pin arrangement includes a first forward pin that extends generally in a forward direction along a first longitudinal centerline. A second rear pin and a third rear pin are spaced substantially equal distance from the first forward pin. Each of the second rear pin and the third rear pin extend along a common rear centerline that is generally transverse to the forward direction. The 3-pin arrangement is cooperatively configured with the windshield bracket such that the first forward pin substantially prevents up-down and side-to-side relative movement while allowing for limited fore-aft relative movement between the first forward pin and the windshield bracket. The second and third rear pins substantially prevent up-down and fore-aft relative movement while allowing for limited side-to-side relative movement between the windshield bracket and the second rear pin and the third rear pin, respectively.

Further objects, features, and advantages of the invention will become apparent to those skilled in the art to which the present invention relates from consideration of the following description and the appended claims, taken in conjunction with the accompanied drawings.

BRIEF DESCRIPTION OF THE DRAWINGS

The drawings described herein are for illustration purposes only and are not intended to limit the scope of the present disclosure in any way.

DETAILED DESCRIPTION OF THE INVENTION

The following description is merely exemplary in nature and is not intended to limit the present disclosure or its application or uses.

Figure 1:
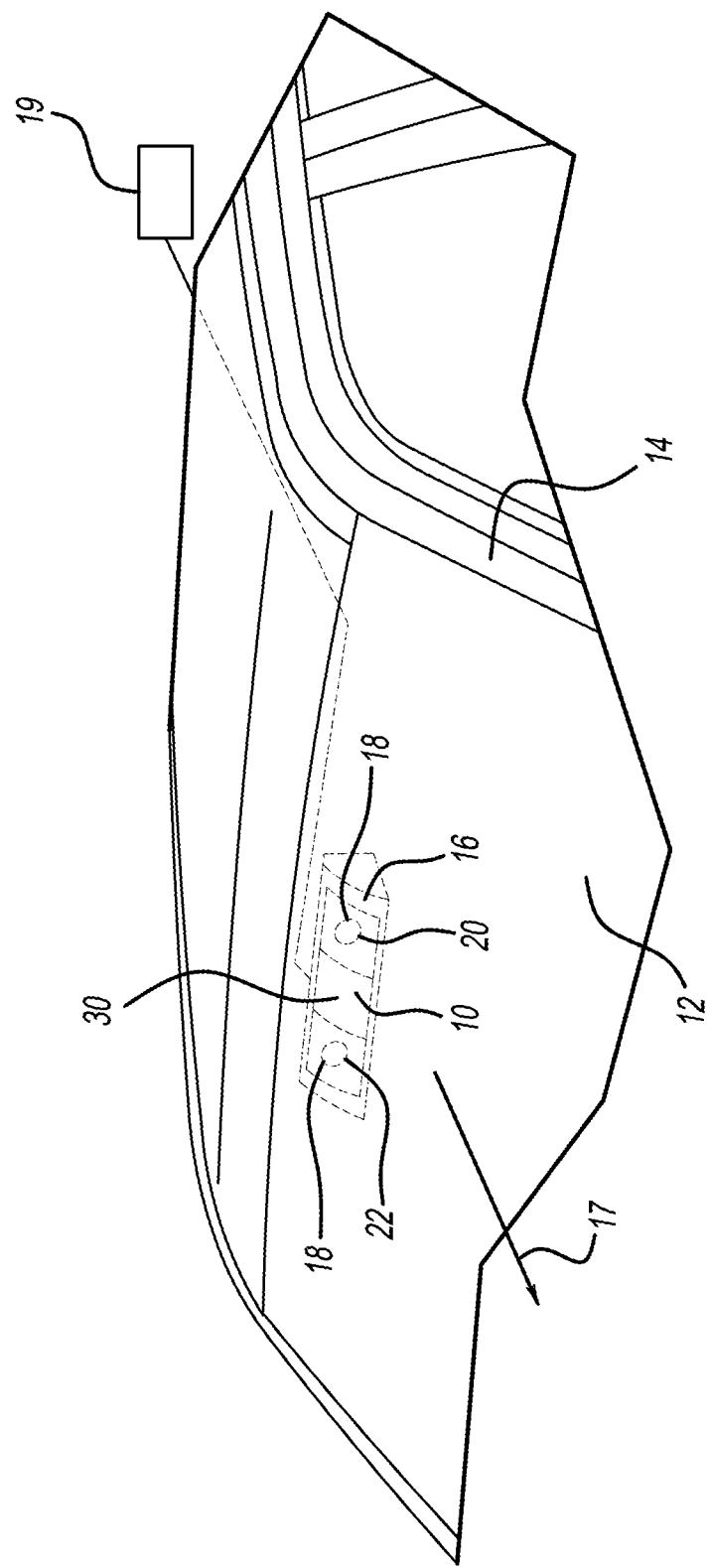
FIG. 1 is perspective view of an apparatus carrying a camera arrangement mounted on a backside of a windshield of a motor vehicle in accordance with an exemplary embodiment.

Referring now to the drawings, FIG. 1 shows an apparatus 10 mounted on backside of a windshield 12 of a motor vehicle 14 in accordance with an exemplary embodiment. As illustrated, the apparatus 10 is mounted on the backside of an upper, middle section of the windshield 12 just forward of a rear view mirror 16. The apparatus 10 is configured to carry a camera arrangement 18 in position to collect data in a vehicle running direction (e.g., forward direction 17). In one example, the camera arrangement 18 collects an image(s) of a forward road environment while running and provides an image signal to an image processing unit 19 that converts the image signal to a various kind of forward data, such as distance data or the like that can be used by one or more other devices and/or control units for driving support.

In an exemplary embodiment, the camera arrangement 18 is configured as a stereo-camera arrangement having a pair of cameras, a first camera 20 and a second camera 22. The cameras 20 and 22 are laterally spaced apart from each other and are supported in a predetermined position, e.g., facing generally towards the forward direction 17.

Figure 2:
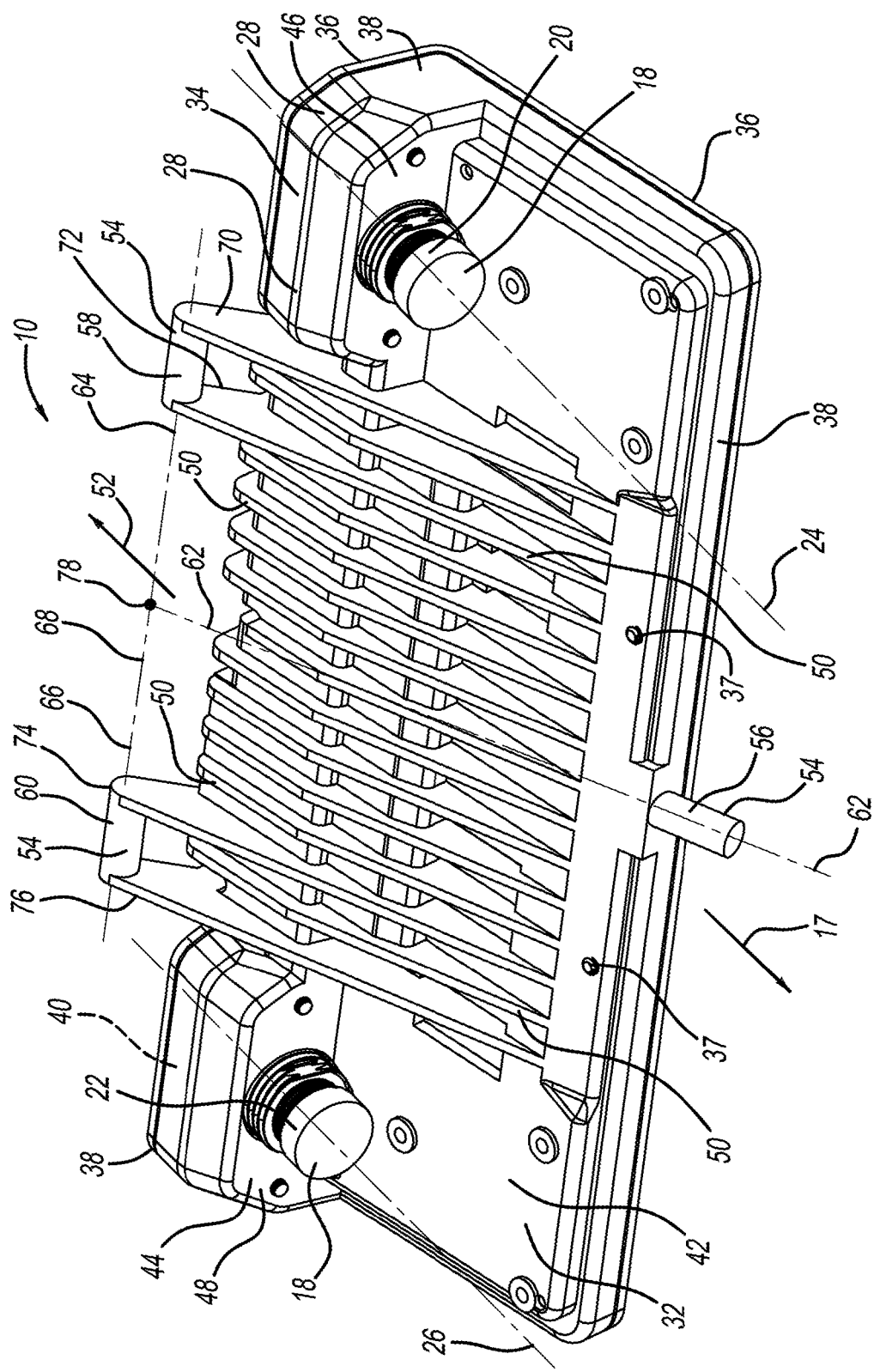
FIG. 2 is a perspective top view of the apparatus including the camera arrangement in accordance with an exemplary embodiment.
Figure 3:
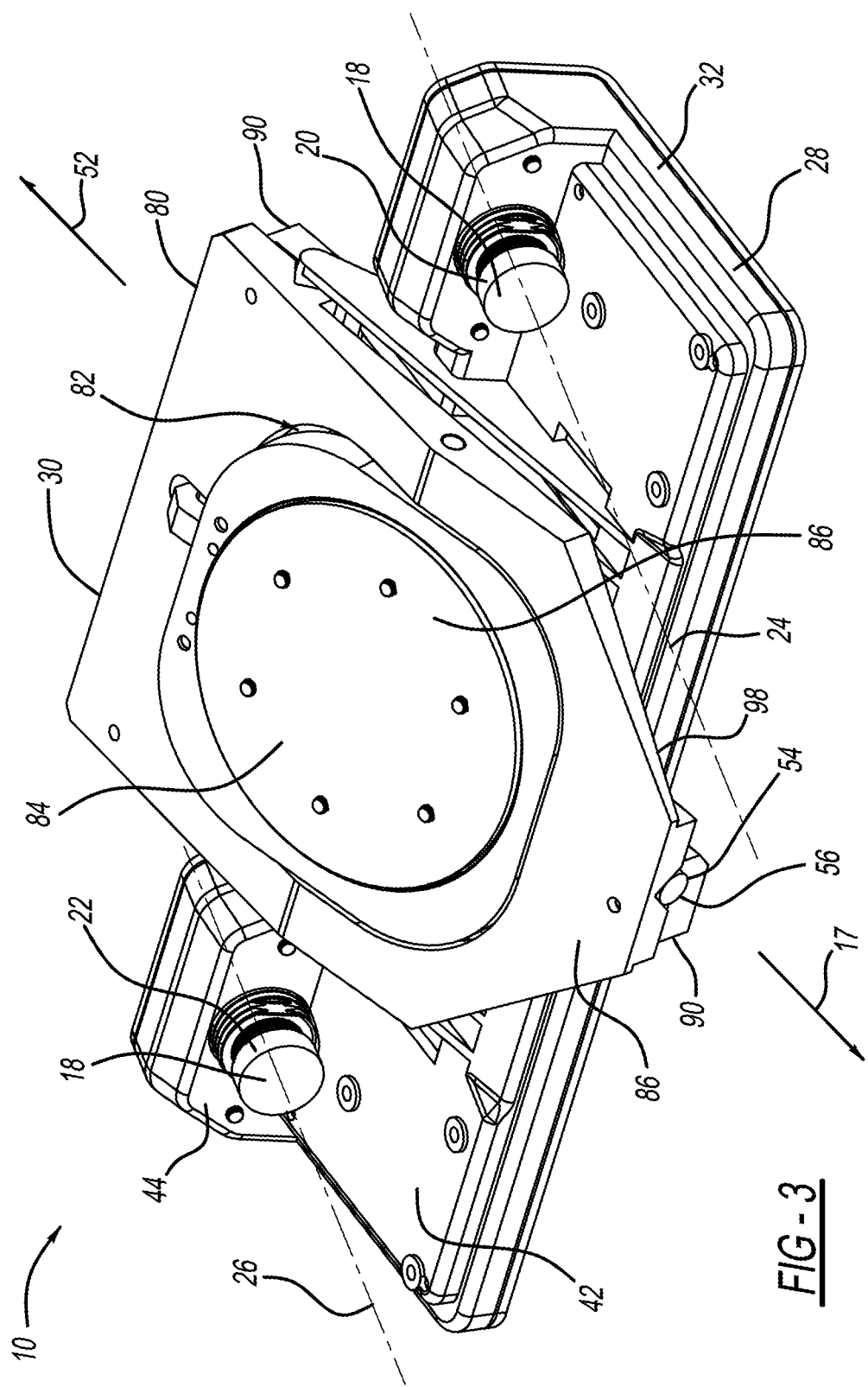
FIG. 3 is a perspective top view of the apparatus including the camera arrangement and a windshield mounting bracket in accordance with an exemplary embodiment.

Referring also to FIGS. 2-3, the cameras 20 and 22 have corresponding optical centerlines 24 and 26 that are substantially parallel. As used herein, the term "substantially" is understood to mean within conventional manufacturing and/or operational tolerances for a particular component(s), assembly, and/or item being referenced. The cameras 20 and 22 are arranged proximate a left side (e.g., driver's side) and a right side (e.g., passenger's side), respectively, of the motor vehicle 14.

In an exemplary embodiment, the apparatus 10 includes a camera housing 28 that carries and holds the camera arrangement 18. As will be discussed in further detail below, the camera housing 28 is directly attached to a windshield bracket 30 that is mounted on or proximate to the windshield 12.

Figure 5:
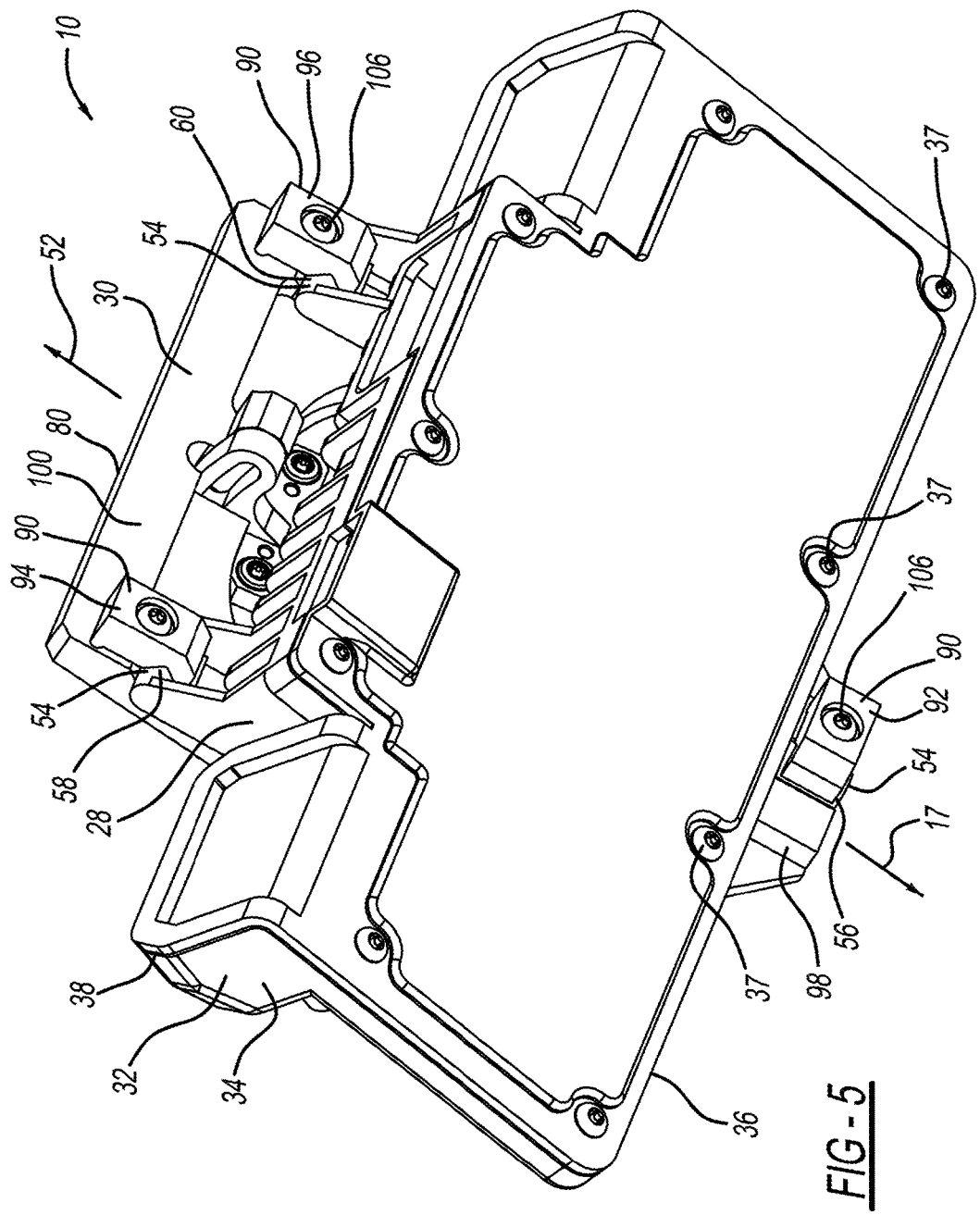
FIG. 5 is a perspective rear view of the apparatus including the camera arrangement and the windshield mounting bracket in accordance with an exemplary embodiment.

Referring to FIG. 2, the camera housing 28 includes a main body 32 that supports the camera arrangement 18 in the predetermined position. The main body 32 includes an upper panel 34 and a lower panel 36 that is coupled to the upper panel 34 along a perimeter edge portion 38 using, for example, fasteners 37 (see also FIG. 5). Together the upper and lower panels 34 and 36 define the main body 32 as a walled enclosure structure with an internal volume 40 for stowing at least a portion of the camera arrangement 18 as well as any associated wiring, electrical bus or buses, electrical interconnect(s), and/or other associated devices or peripherals for enabling operation of the camera arrangement 18 and/or communication between the camera arrangement 18 and the image processing unit 19 (shown FIG. 1).

In the illustrated embodiment, the walled enclosure structure of the main body 32 has a generally L-shaped structure with a generally horizontal base 42 and a generally vertical wall structure 44 that extends vertically from the generally horizontal base 42 and that holds the camera arrangement 18 in the predetermined position. In particular, the generally vertical wall structure 44 has a left side section 46 (e.g., driver's side) that carries the camera 20 and a right side section 48 (e.g., passenger side) that carries the camera 22.

Disposed between cameras 20 and 22 and the corresponding left and right side sections 46 and 48 of the generally vertical wall structure 44 are a plurality of reinforcing ribs 50 that extend vertically at an incline that rises in generally a rearward direction 52. Among other advantages discussed in further detail below, the reinforcing ribs 50 help provide additional rigidity to the walled enclosed structure of the camera housing 28 to facilitate holding the camera arrangement 18 steady to facilitate maintaining parallelism between the optical centerlines 24 and 26 of the cameras 20 and 22. Additionally, the camera housing 28 can be formed of a material having a high-stiffness and a high-coefficient of thermal conductivity such as an aluminum alloy to help hold the camera arrangement 18 steady and maintain the dimensional relationship between the cameras 20 and 22 even when the apparatus 10 is exposed to temperature changes to further improve maintaining parallelism between the optical centerlines 24 and 26.

Figure 4:
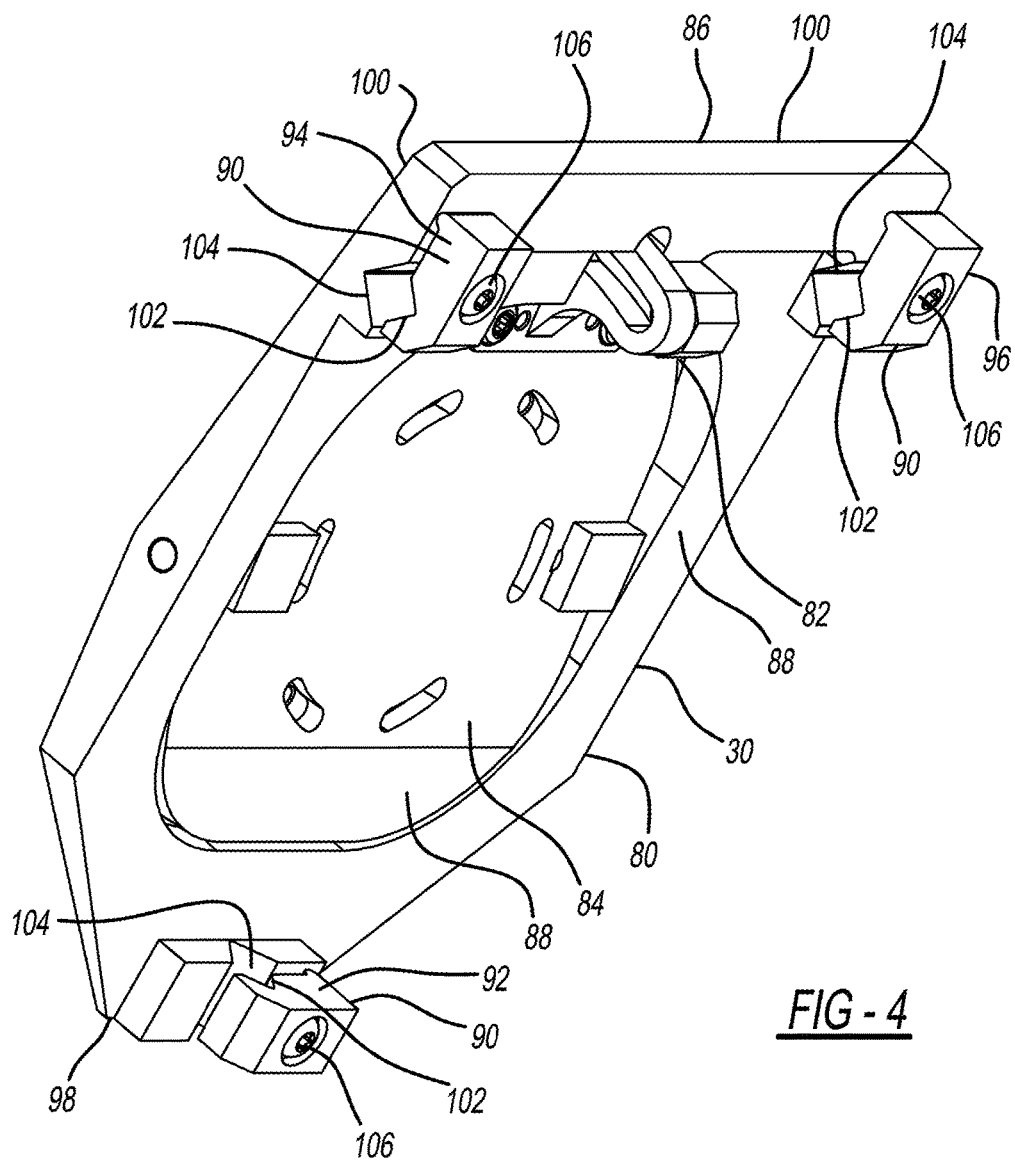
FIG. 4 is a perspective rear view of the windshield mounting bracket in accordance with an exemplary embodiment.

In an exemplary embodiment, the camera housing 28 also includes a 3-attachment feature arrangement 54 for coupling the main body 32 directly to the windshield bracket 30 (shown in FIGS. 3-5) for mounting on the motor vehicle 14 (shown in FIG. 1). In particular, the 3-attachment feature arrangement 54 includes an attachment feature 56 (e.g., a forward attachment feature) and attachment features 58 and 60 (e.g., rear attachment features). As illustrated, the attachment feature 56 is disposed generally forward of the camera arrangement 18 extending generally in the forward direction 17 from a forward edge (e.g., at or proximate the middle portion of the forward edge) of the horizontal base 42 of the main body 32. The attachment features 58 and 60 are disposed generally rearward of the camera arrangement 18 extending in a direction(s) that is generally transverse to the forward direction 17. In this example, further extended reinforcing ribs 70, 72, 74, 76 extend beyond their neighboring reinforcing ribs 50 and couple to the ends of the attachment features 58 and 60 and to the main body 32 generally inboard of the cameras 20 and 22 above the main body 32. Alternatively, the attachment features 58 and 60, independently, may have an open end, for example, in which only one of the further extending reinforcing ribs 70 or 72 coupled to one of the ends of the attachment feature 58 and/or only one of the further extending reinforcing ribs 74 or 76 couple to one of the ends of the attachment feature 60.

In an exemplary embodiment, the attachment features 56, 58, and 60 are each configured as a positive feature such as a pin having a generally elongated cylindrical shape extending along its respective longitudinal centerline 62, 64, or 66 (e.g., a central longitudinal axis). As illustrated, the attachment features 58 and 60 are aligned such that their corresponding longitudinal centerlines 64 and 66 are also aligned to form a common centerline 68 (e.g., common rear centerline) that is generally transverse to the forward direction 17. In one embodiment, the longitudinal centerlines 62, 64, and 66 are substantially coplanar. In another embodiment, the longitudinal centerline 62 intersects the common centerline 68 proximate a midpoint 78 between the attachment features 58 and 60. In yet another embodiment, the longitudinal centerline 72 is perpendicular to the common centerline 68. For example, the attachment feature 58 (e.g., pin) and the attachment feature 60 (e.g., pin) may be spaced substantially equal distance from the attachment feature 56 (e.g., pin) such that the longitudinal centerline 62 is perpendicular to and intersects the common centerline 68 at or proximate the midpoint 78.

Referring to FIGS. 2-5, in an exemplary embodiment, the camera housing 28 is directly attached to the windshield bracket 30 via the 3-attachment feature arrangement 54. In particular, the windshield bracket 30 has a top surface 86 for mounting to the windshield 12 (shown in FIG. 1) and a bottom surface 88 opposite the top surface 86. The windshield bracket 30 includes an outer plate 80 that defines an opening 82 and an adjustable plate 84 that is disposed in the opening 82. The windshield bracket 30 is configured such that the top surface 86 of the adjustable plate 84, which may be directly mounted on the windshield 12, can be adjusted to be substantially planar or non-planar with (e.g., at an incline to) the top surface 86 of the outer plate 80 so as to adjust the position of the camera housing 28 as desired relative to the windshield 12.

On or adjacent to the bottom surface 88 of the outer plate 80 is a 3-attachment feature receiving arrangement 90 that captures the 3-attachment feature arrangement 54 for coupling the camera housing 28 to the windshield bracket 30. In particular, the 3-attachment feature receiving arrangement 90 includes attachment receiving features 92, 94, and 96 that are positioned along the bottom surface 88 of the outer plate 80 and configured so as to receive and retain the attachment features 56, 58, and 60, respectively. In one example, the attachment receiving feature 92 is positioned along a forward section 98 of the outer plate 80 and the attachment receiving features 94 and 96 are laterally aligned and positioned along a rearward section 100 of the outer plate 80.

In an exemplary embodiment, the attachment receiving features 92, 94, and 96 are each configured as a clamp that has a groove 102 formed therein that aligns with an opposing groove 104 formed in or adjacent to the bottom surface 88 of the outer plate 84 for receiving a corresponding attachment feature 56, 58, or 60 (e.g., positive feature or pin). Additionally, each of the attachment receiving features 92, 94, and 96 may include a fastener 106 that is used to attach the attachment receiving feature 92, 94, or 96 to the outer plate 80 and thereby apply a clamping force to the corresponding attachment feature 56, 58, or 60 when the attachment feature 56, 58, or 60 are positioned in the grooves 102 and 104. Alternatively, the attachment receiving features 92, 94, and/or 96 and the corresponding attachment features 56, 58, and/or 60 may be cooperatively configured such that the attachment features 56, 58, and/or 60 snapfit or otherwise couple to the attachment receiving features 92, 94, and/or 96 without the use of any fasteners 106.

In an exemplary embodiment, when the camera housing 28 is directly attached to the windshield bracket 30, the attachment receiving feature 92, the grooves 102 and 104, and the attachment feature 56 cooperate such that the attachment feature 56 is substantially prevented from up-down and side-to-side relative movement (e.g., relative movement transverse to the forward and rearward directions 17 and 52) while allowing for limited fore-aft relative movement (e.g., relative movement along the forward and rearward directions 17 and 52) between the attachment feature 56 and the windshield bracket 30. Likewise, the attachment receiving features 94, and 96, the grooves 102 and 104, and the attachment features 58, and 60 cooperate such that the attachment features 58 and 60 are substantially prevented from up-down and fore-aft relative movement while allowing for limited side-to-side relative movement between the windshield bracket 30 and the respective attachment features 58 and 60. In another exemplary embodiment, when the camera housing 28 is directly attached to the windshield bracket 30, the attachment feature 56 can rotate about (e.g., around) the axis 62 while preventing or limiting side-to-side relative movement while the rear attachment features 58 and 60 prevent rotation about the axis 62 and further, prevent or limit fore-aft relative movement.

In one example, the attachment feature 56 is substantially prevented from up-down and side-to-side relative movement while allowing for limited fore-aft relative movement between the attachment feature 56 and the windshield bracket 30 a distance of from about +/−5 mm or less, for example about +/−2 mm. In another example, the attachment features 58 and 60 are substantially prevented from up-down and fore-aft relative movement while allowing for limited side-to-side relative movement between the windshield bracket 30 and the respective attachment features 58 and 60 a distance of from about +/−5 mm or less, for example about +/−2 mm.

Advantageously, it has been found that by allowing for limited fore-aft relative movement between the attachment feature 56 and the windshield bracket 30 and for limited side-to-side relative movement between the windshield bracket 30 and the respective attachment features 58 and 60, the dimensional relationship between the cameras 20 and 22 is substantially maintained because the camera housing 28 can expand or contract with changing temperatures without building up significant stresses (e.g., reaction forces) and becoming distorted. In an exemplary embodiment, this helps to maintain parallelism between the optical centerlines 24 and 26 (e.g., stereo calibration) of the cameras 20 and 22 even when the apparatus 10 is exposed to temperature changes.

In particular, the temperatures of the apparatus 10 may change due to climate and/or camera temperature and/or car interior temperatures. In an exemplary embodiment, the advantage of the 3-attachment feature arrangement 54 versus other multiple-attachment feature arrangements, e.g., 4 pin-attachment feature arrangements or the like, is that each of the attachment features of the 3-attachment feature arrangement 54 are in intimate contact (e.g., having tight tolerance(s)) with the windshield bracket 30 while a 4 pin-attachment feature arrangement or greater may have one or more pin-attachment features that is not fully coupled to the windshield bracket 30. In another exemplary embodiment, advantageously the 3-attachment feature arrangement 54 when attached or snapfit to the windshield bracket 30, the tolerance(s) between pin and attachment features allows for some relative movement in each of the given axes, therefore allowing the assembly some freedom to expand and/or contract without building up significant stresses while keeping the appropriate calibration between the cameras over a temperature range whereas if these attachment features were rigidly connected, the camera housing 28 can deform from temperature changes, thereby leading to mis-calibration (e.g., mis-alignment) of the cameras. Additionally, in exemplary embodiment, the 3-attachment feature arrangement 54 allows for easy and secure attachment to the motor vehicle 14 (e.g., windshield 12 and/or windshield bracket 30).

Figure 6:
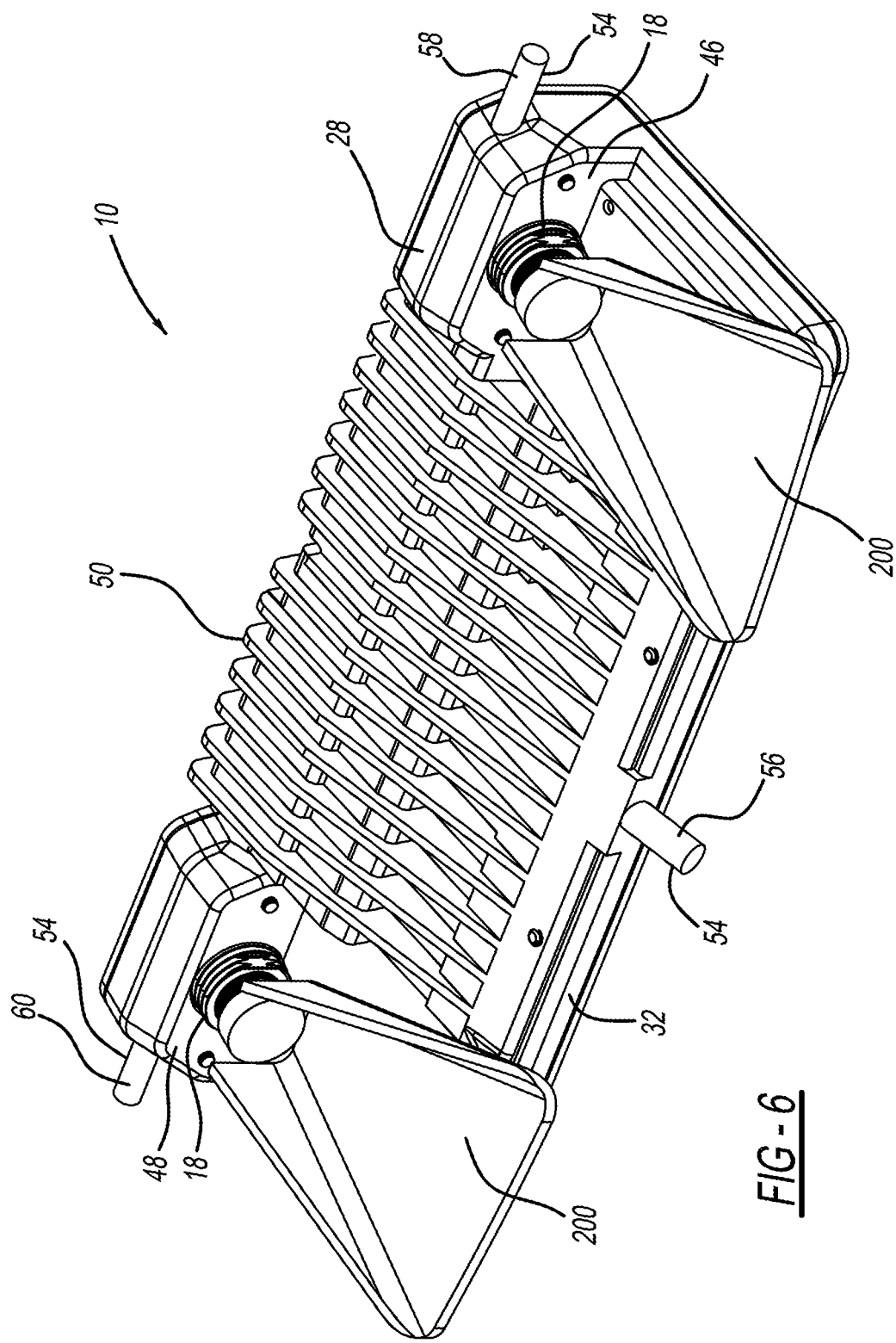
FIG. 6 is a perspective top view of the apparatus including the camera arrangement in accordance with another exemplary embodiment.

Referring to FIG. 6, the forward attachment feature 56 and the rear attachment features 58 and 60 may be reconfigured in accordance with the exemplary embodiments described herein to accommodate various motor vehicle designs and styling. For example and as illustrated, the rear attachment features 58 and 60 may be positioned outboard of the camera arrangement 18 extending laterally directly from the left side section 46 and the right side section 48 of the main body 32 of the camera housing 28. Additionally, for example, lower shields 200 may be attached to the main body 32 adjacent to the viewing window of the camera arrangement 18, for example, to help prevent or reduce glare and/or light reflections. Alternative configurations are also possible and within the scope of the exemplary embodiments described herein.

As a person skilled in the art will readily appreciate, the above description is meant as an illustration of the implementation of the principles of this invention. This description is not intended to limit the scope or application of this invention in that the invention is susceptible to modification, variation, and change, without departing from the spirit of this invention as defined in the following claims.

The invention claimed is:

1. An apparatus for mounting a camera arrangement on a motor vehicle, the apparatus comprising:
   a camera housing comprising:
      a main body configured for holding the camera arrangement in a predetermined position; and
      an attachment feature arrangement coupled to the main body and configured for mounting the main body to the motor vehicle, wherein the attachment feature arrangement comprises:
         a first attachment feature having a first longitudinal centerline;
         a second attachment feature having a second longitudinal centerline; and
         a third attachment feature having a third longitudinal centerline, wherein the second and third longitudinal centerlines are aligned to define a common centerline and the first longitudinal centerline intersects the common centerline proximate a midpoint between the second attachment feature and the third attachment feature, and wherein, in an assembled configuration of the attachment feature arrangement with the motor vehicle, the first attachment feature substantially prevents an up-down and a side-to-side movement while allowing for a limited amount of a fore-aft movement, and the second and third attachment features substantially prevent the up-down and the fore-aft movement while allowing for a limited amount of the side-to-side movement.

2. The apparatus of claim 1, wherein the first longitudinal centerline is generally perpendicular to the common centerline.

3. The apparatus of claim 1, wherein the first attachment feature, the second attachment feature, and the third attachment feature are each configured as a pin having a generally elongated cylindrical shape.

4. The apparatus of claim 1, wherein the first attachment feature extends generally in a forward direction along the first longitudinal centerline.

5. The apparatus of claim 4, wherein the second and third attachment features extend along the common centerline that is generally transverse to the forward direction.

6. The apparatus of claim 1, further comprising the camera arrangement configured as a stereo-camera arrangement that comprises a first camera and a second camera, and wherein the main body of the camera housing holds the first camera laterally spaced apart from the second camera.

7. The apparatus of claim 6, wherein the second and third attachment features are disposed generally inboard of the first and second cameras.

8. The apparatus of claim 1, further comprising a windshield bracket that mounts on or proximate to a windshield of the motor vehicle, and wherein the attachment feature arrangement is attached to the windshield bracket.

9. The apparatus of claim 8, wherein the attachment feature arrangement is attached to the windshield bracket such that the first attachment feature allows for the limited amount of the fore-aft relative movement between the first attachment feature and the windshield bracket of a distance of from about +/−2 mm.

10. The apparatus of claim 8, wherein the attachment feature arrangement is attached to the windshield bracket such that the second and third attachment features allow for the limited amount of the side-to-side relative movement between the windshield bracket and the second attachment feature and the third attachment feature, respectively, a distance of from about +/−2 mm.

11. An apparatus for mounting a camera arrangement on a motor vehicle, the apparatus comprising:
   a camera housing comprising:
      a main body configured for holding the camera arrangement in a predetermined position; and
      a pin arrangement coupled to the main body and configured for attaching to a windshield bracket that mounts on or proximate to a windshield of the motor vehicle, wherein the pin arrangement comprises:
         a first forward pin extending generally in a forward direction along a first longitudinal centerline;
         a second rear pin and a third rear pin spaced substantially equal distance from the first forward pin and each extending along a common rear centerline that is generally transverse to the forward direction, wherein the pin arrangement is cooperatively configured with the windshield bracket such that the first forward pin substantially prevents an up-down and a side-to-side relative movement while allowing for a limited amount of a fore-aft relative movement between the first forward pin and the windshield bracket, and the second and third rear pins substantially prevent the up-down and the fore-aft relative movement while allowing for a limited amount of the side-to-side relative movement between the windshield bracket and the second rear pin and the third rear pin, respectively.

12. The apparatus of claim 11, wherein the first, second, and third longitudinal centerlines are substantially coplanar.

13. The apparatus of claim 11, wherein the first longitudinal centerline is perpendicular to the common rear centerline.

14. The apparatus of claim 11, wherein the first longitudinal centerline intersects the common rear centerline proximate a midpoint between the second rear attachment feature and the third rear attachment feature.

* * * * *